United States Patent
Lee

(10) Patent No.: US 8,648,824 B2
(45) Date of Patent: Feb. 11, 2014

(54) FLAT PANEL DISPLAY INTEGRATED TOUCH SCREEN PANEL

(75) Inventor: Kyung-Jun Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 13/087,260

(22) Filed: Apr. 14, 2011

(65) Prior Publication Data

US 2012/0127092 A1    May 24, 2012

(30) Foreign Application Priority Data

Nov. 18, 2010 (KR) .................. 10-2010-0114921

(51) Int. Cl.
*G06F 3/041* (2006.01)
(52) U.S. Cl.
USPC .......................... 345/173; 345/104; 445/43
(58) Field of Classification Search
None
See application file for complete search history.

(56) References Cited

U.S. PATENT DOCUMENTS

| | | | |
|---|---|---|---|
| 6,407,763 B1 * | 6/2002 | Yamaguchi et al. | 347/112 |
| 2009/0096754 A1 * | 4/2009 | Hinata | 345/173 |
| 2009/0194342 A1 * | 8/2009 | Kuo et al. | 178/18.03 |
| 2009/0225269 A1 * | 9/2009 | Lu et al. | 349/158 |
| 2011/0134056 A1 * | 6/2011 | Kim et al. | 345/173 |

FOREIGN PATENT DOCUMENTS

| | | |
|---|---|---|
| KR | 10-1073333 B1 | 10/2011 |
| KR | 10-1082162 B1 | 11/2011 |
| KR | 10-1082294 B1 | 11/2011 |

OTHER PUBLICATIONS

Korean Patent Abstracts for Korean Publication 1020110022269, dated Mar. 7, 2011, for corresponding Korean Patent 10-1073333 listed above.
Korean Patent Abstracts for Korean Publication 1020110025375, dated Mar. 10, 2011, for corresponding Korean Patent 10-1082294 listed above.
Korean Patent Abstracts for Korean Publication 1020110062469, dated Jun. 10, 2011, for corresponding Korean Patent 10-1082162 listed above.

* cited by examiner

*Primary Examiner* — Bipin Shalwala
*Assistant Examiner* — Yaron Cohen
(74) *Attorney, Agent, or Firm* — Christie, Parker & Hale, LLP

(57) ABSTRACT

A flat panel display integrated with a touch screen panel according to an embodiment of the present invention includes: an upper substrate and a lower substrate each divided into a display region and first and second non-display regions around the display region; a plurality of sensing patterns in the display region of the upper substrate; a plurality of sensing lines in the first non-display region of the upper substrate; an FPC bonding pad unit including a plurality of bonding pads coupled with the sensing lines, in the second non-display region of the upper substrate; a sealant between the second non-display regions of the first substrate and the second substrate; and transparent conductive patterns arranged at a same distance from the sealant in the second non-display region of the upper substrate, the transparent conductive patterns overlapping the sealant.

10 Claims, 5 Drawing Sheets

FLAT PANEL DISPLAY INTEGRATED TOUCH SCREEN PANEL

CROSS-REFERENCE TO RELATED APPLICATION

This application claims priority to and the benefit of Korean Patent Application No. 10-2010-0114921, filed on Nov. 18, 2010, in the Korean Intellectual Property Office, the entire content of which is incorporated herein by reference.

BACKGROUND

1. Field

Aspects of embodiments according to the present invention relate to a flat panel display, particularly, a flat panel display integrated with a touch screen panel.

2. Description of the Related Art

Touch screen panels are input devices that select contents displayed on the screen of an image display device, etc., using a person's hand or an object to input commands of a user.

To this end, the touch screen panels are provided on a front face of the image display device and convert positions where a person's hand or an object directly contacts into electrical signals. Accordingly, the instruction selected at the contact point or position is received as an input signal.

As the touch screen panels can replace separate input devices, e.g., a keyboard and a mouse, that are operated by being connected with the image display device, the application of the touch screen panels is being expanded gradually.

Known types of touch screen panels include an ohmic layer type, a photosensitive type, and an electrostatic type. An electrostatic type touch screen panel converts a contact position into an electrical signal by a conductive sensing pattern that senses a change in electrostatic capacitance formed with another sensing pattern or a ground electrode, when a person's hand or an object contacts the touch screen panel.

The touch screen panel is generally attached to the outside of a flat panel display, such as a liquid crystal display device or an organic light emitting display device, and when a touch screen panel separately manufactured is attached to a flat panel display, the entire thickness of the product is increased and the manufacturing cost is increased.

SUMMARY

Aspects of embodiments according to the present invention are directed toward a flat panel display integrated with a touch screen panel that makes it possible to overcome a problem in which a sealant is separated from the substrate, by directly forming a touch screen panel on the upper substrate of a flat panel display and implementing FPC bonding pads of the touch screen panel, which are in the region corresponding to the sealant encapsulating the upper substrate and the lower substrate of the flat panel display, using transparent conductive materials (e.g., transparent conductive patterns).

Further, another aspect of the present invention is directed toward a flat panel display integrated with a touch screen panel that can be implemented with the same power of a laser beam radiated to harden the sealant, throughout the entire region, by forming the transparent conductive patterns in the region on the upper substrate which overlaps the sealant, at the same distances as the transparent conductive patterns on an FPC bonding pad unit.

In one embodiment of the present invention, a flat panel display integrated with a touch screen panel includes: an upper substrate and a lower substrate each including a display region and first and second non-display regions around the display region; a plurality of sensing patterns in the display region of the upper substrate; a plurality of sensing lines in the first non-display region of the upper substrate; an FPC bonding pad unit including a plurality of bonding pads coupled with the sensing lines, in the second non-display region of the upper substrate; a sealant between the second non-display regions of the upper substrate and the lower substrate; and transparent conductive patterns arranged at a same distance from the sealant in the second non-display region of the upper substrate, the transparent conductive patterns overlapping the sealant.

Further, the transparent conductive patterns may include the same material as the sensing patterns, may include first transparent conductive patterns on the FPC bonding pad unit and second transparent conductive patterns on the second non-display region, other than the FPC bonding pad unit, and the distance between the transparent conductive patterns may be about 300 μm.

Further, the bonding pads of the FPC bonding pad unit may include a first region overlapping the sealant and a second region not overlapping the sealant, and configurations of the first and second regions are different for each of the regions.

In an embodiment, the first region of the bonding pad may include: a first insulating layer with a first open region in the second non-display region of the upper substrate; a first transparent conductive pattern at the first open region; and a second insulating layer with a second open region overlapping the first transparent conductive pattern such that the first transparent conductive pattern is exposed.

Further, the second region of the bonding pad may include: an opaque metal pattern in the second non-display region of the upper substrate; a first insulating layer with a first open region overlapping the opaque metal pattern such that the opaque metal pattern is exposed; a first transparent conductive pattern in a region overlapping the exposed opaque metal pattern; and a second insulating layer with a second open region overlapping the first transparent conductive pattern such that the first transparent conductive pattern is exposed, and the opaque metal pattern may include a same material as the sensing lines.

Further, the opaque metal pattern may be spaced at a distance from the sealant, and the distance may be about 100 um.

Further, the sensing patterns may include X-sensing patterns and Y-sensing patterns on different layers. The X-sensing patterns may be patterned to be coupled in a first direction and the Y-sensing patterns may be patterned to be coupled in a second direction crossing the first direction.

Further, the sealant may be melted by a laser, and the upper substrate and the lower substrate are bonded together by hardening of the sealant.

According to the exemplary embodiments of the present invention described above, when a touch screen panel is directly implemented on the upper substrate of a flat panel display, the FPC bonding pads of the touch screen panel may be made of transparent conductive materials (e.g., transparent conductive patterns), overlapping a sealant, to transmit a laser, such that the sealant in the overlapping region is sufficiently hardened by radiating the sealant with the laser, and it is possible to overcome a problem in separating the sealant from the region.

Further, since the transparent conductive patterns are formed on the region of the upper substrate which overlaps the sealant, at the same distance from each other as the transparent conductive patterns on the FPC bonding pad unit, it is possible to overcome the problem caused when the transparent conductive patterns are formed only in the FPC bonding pad unit, that is, a change in effective seal width due to reduction of intensity of the laser beam in comparison to the other regions, and it is possible to further simplify the manufacturing process by keeping the laser power the same when radiating with the laser.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

Figure 1:
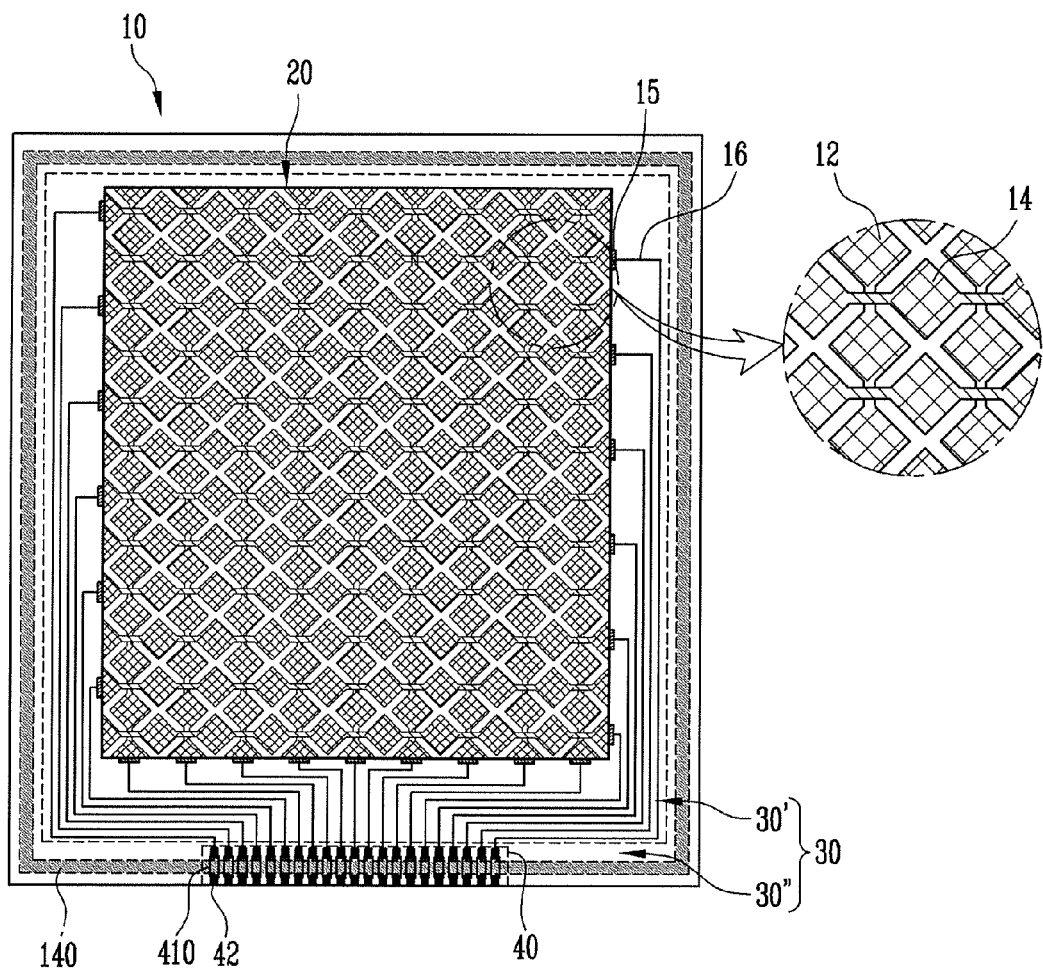
FIG. 1 is a plan view showing an upper substrate of a flat panel display according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, embodiments of the present invention will be described in detail with reference to the accompanying drawings.

Figure 2:
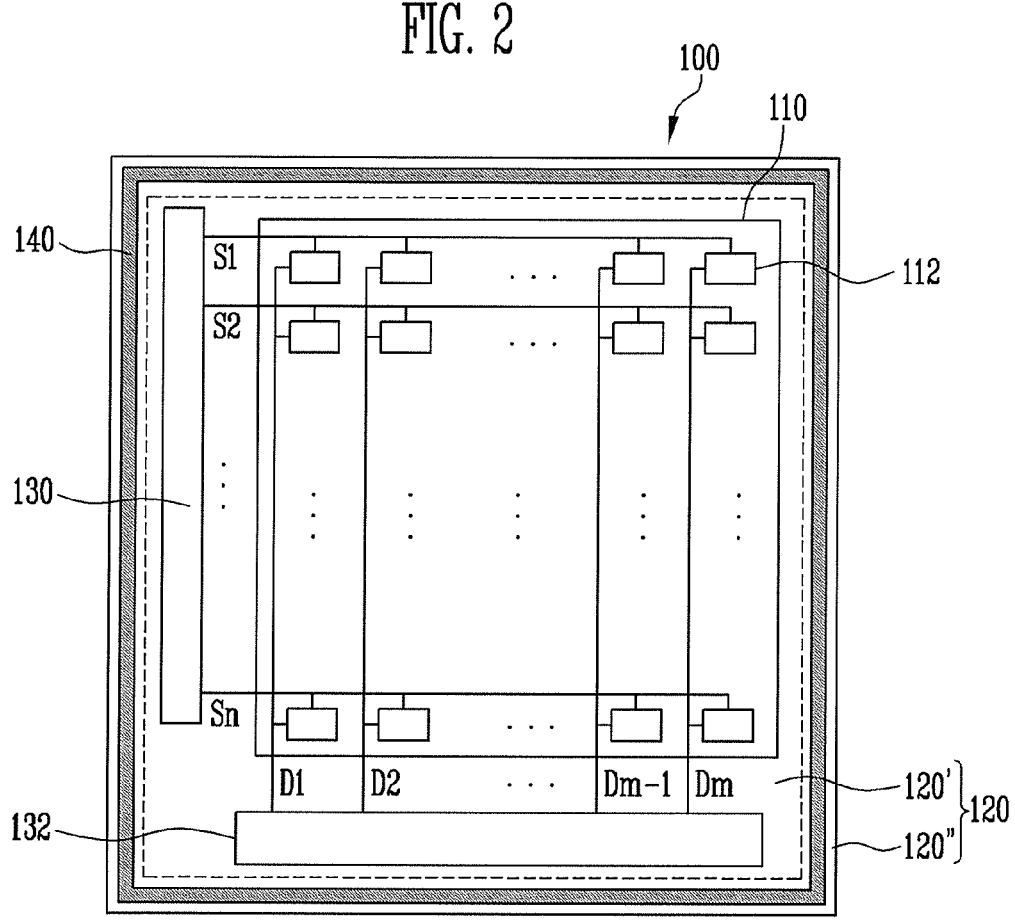
FIG. 2 is a plan view showing a lower substrate of a flat panel display corresponding to FIG. 1.
Figure 3:
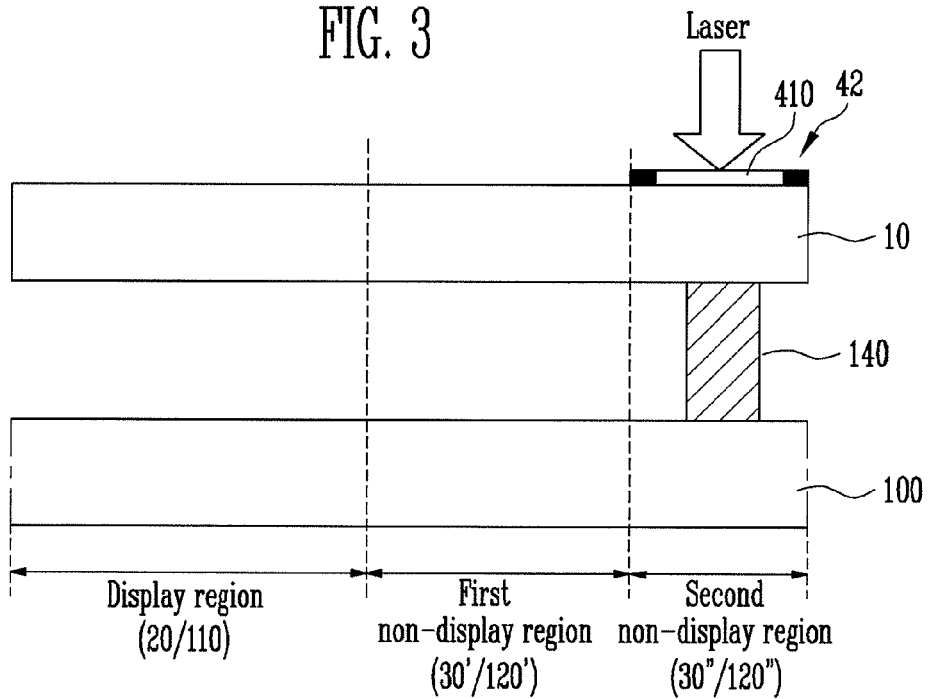
FIG. 3 is a cross-sectional view of a portion of a flat panel display according to an embodiment of the present invention.

FIG. 1 is a plan view showing an upper substrate of a flat panel display according to a first embodiment of the present invention, FIG. 2 is a plan view showing a lower substrate of a flat panel display corresponding to FIG. 1, and FIG. 3 is a cross-sectional view of a portion of a flat panel display according to an embodiment of the present invention.

Referring to FIG. 1 first, a touch screen panel according to an embodiment of the present invention is characterized by being directly on an upper substrate 10 of a flat panel display. The flat panel display may be an organic light emitting display device or a liquid crystal display device, and embodiments of the present invention exemplify the organic light emitting display device.

Therefore, the upper substrate 10 is an encapsulation substrate of the organic light emitting display device and is made of a transparent material according to an embodiment.

A touch screen panel according to an embodiment of the present invention includes a plurality of sensing patterns 12 and 14 on the upper substrate, that is, the encapsulation substrate, and metal pads 15 and sensing lines 16 electrically coupled with the sensing patterns 12 and 14.

In this configuration, the region where the sensing patterns 12 and 14 are formed is a display region 20 that displays an image and senses a touch position, and the region where the metal pads 15 and the sensing lines 16 electrically couple with the sensing patterns are formed is a non-display region 30 that is around the display region 20.

Further, in an embodiment of the present invention, the non-display region 30 is divided into a first non-display region 30' where the metal pads 15 and the sensing lines 16 are formed and a second non-display region 30" around the first non-display region 30' and having an FPC bonding pad unit 40 including a plurality of bonding pads 42 coupled with the sensing lines 16.

In this configuration, a sealant 140 for bonding the upper substrate 10 with the lower substrate (e.g., shown in FIG. 2) of the organic light emitting display device is on the bottom of the second non-display region 30", such that the upper substrate 10 and the lower substrate (not shown) are bonded by radiating a laser onto the second non-display region 30" to harden the sealant 140.

As shown in FIG. 1, the sensing patterns 12 and 14 are alternately arranged in the display region 20 and include X-sensing patterns 12 and Y-sensing patterns 14 to be coupled with each other in one column with the same X coordinate or in one row with the same Y coordinate.

For example, the X-sensing patterns 12 may include a plurality of X-patterns formed such that the sensing patterns arranged in one column with the same X coordinate are coupled to each other in a first direction (column direction). Further, the Y-sensing patterns 14 may include a plurality of Y-patterns formed such that the sensing patterns arranged in one row with the same Y coordinate are coupled to each other in a second direction (row direction).

The X- and Y-sensing patterns 12 and 14 are between insulating layers and may be on different layers.

In this case, patterning may be performed such that the X-sensing patterns 12 are coupled in the first direction, and patterning may be performed such that the Y-sensing patterns 14 are coupled in the second direction. Therefore, it is possible to remove the process of forming a contact hole or connecting patterns, such that the mask number is reduced and the process is simplified.

However, this is just one embodiment of the present invention and the present invention is not limited thereto.

For example, the X- and Y-sensing patterns 12 and 14 may be formed on the same layer, that is, on the glass substrate 10. In this case, the X- or Y-sensing patterns 12 or 14 may be coupled in the first or second direction by patterning, and the others may be coupled in the first or second direction by forming contact holes and connecting patterns.

Further, the metal pads 15 are located at the periphery of the display region 20, where the X- and Y-sensing patterns 12 and 14 are formed, that is, the end of the first non-display region 30', and couple the X- and Y-sensing patterns 12 and 14 with the sensing lines 16 on the first non-display region 30'.

In more detail, each of the metal pads 15 electrically couples the X- or Y-sensing patterns 12 or 14 in one column or one row with a corresponding one of the sensing lines 16, such that contact sense signals are supplied to the driving circuit of the touch screen panel.

For example, the metal pads 15 electrically couple the first sensing patterns 12 in columns with the sensing lines 16 and can electrically couple the second sensing patterns 14 in rows with the sensing lines 16, and the sensing lines 16 are coupled with the X- and Y-sensing patterns 12 and 14 through the metal pads 15 and couple them to the driving circuit.

In one embodiment, the metal pads 15 and the sensing lines 16 are made of a low-resistance opaque metal.

That is, the touch screen panel is coupled with an FPC (flexible printed circuit) equipped with an external driving circuit through the FPC bonding pad unit 40, and the sensing lines 16 are coupled between a plurality of bonding pads 42 of the FPC bonding pad unit 40 and the sensing patterns 12 and 14.

The touch screen panel is a capacitive touch screen panel, in which when a contact object, such as a human's hand or a touch stick, contacts the touch screen panel, a change in electrostatic capacitance in accordance with the contact position is transmitted from the sensing patterns 12 and 14 to the driving circuit through the metal pads 15 and the sensing lines 16. Further, the change in electrostatic capacitance is converted into an electric signal by an X- and Y-input process circuit, such that the contact position is located.

Referring to FIG. 2, the lower substrate 100 opposite to the upper substrate 10 (shown in FIG. 1) includes a display region 110 with pixels 112 each including an organic light emitting element having a first electrode, an organic layer, and a second electrode, and a non-display region 120 around the display region 110.

In this configuration, the display region 110 is a region where an image is displayed by light emitted from the organic light emitting elements. The non-display region 120 is divided into a first non-display region 120' where driving circuits, including a data driving circuit 132 and a scan driving circuit 130, are formed to drive the pixels 112 on the display region 110 and a second non-display region 120" around the first non-display region 120' where a sealant 140 bonding the lower substrate 100 with the upper substrate 10 is formed.

That is, the display region 110 and the first and second non-display regions 120' and 120" of the lower substrate 100 correspond to the display region 20 and the first and second non-display regions 30' and 30" of the upper substrate 10 to overlap them, which is shown in FIG. 3.

The display region 110 includes a plurality of scan lines S1 to Sm extending in the row direction and a plurality of data lines D1 to Dm extending in the column direction, and a plurality of pixels 112 receiving signals from the driving circuits 130 and 132 for driving the organic light emitting elements are coupled to the scan lines S1 to Sm and the data lines D1 to Dm.

Further, the driving circuits 130 and 132 for driving the organic light emitting elements and metal wires electrically coupled with the scan lines S1 to Sm and the data lines D1 to Dm of the display region are in the first non-display region 120'. The driving circuits include the data driving circuit 132 and the scan driving circuit 130 in the embodiment shown in FIG. 2, and may be implemented by one IC.

Further, the sealant 140 is in the second non-display region 120" and seals the display region 110 such that external air cannot permeate between the upper substrate 10 and the lower substrate 100.

However, although FIG. 2 shows that the driving circuits 130 and 132 are inside the sealant 140, the driving circuits may be outside the sealant 140.

In one embodiment, a solid-state frit may be used for the sealant 140. In order to manufacture a frit, a glass powder-state frit is produced by rapidly removing heat applied to glass, and the frit is generally used with oxide powder in glass powder. Further, a gel-state paste is produced by adding an organic substance in the frit containing the oxide powder and then plastic-worked within 300° C. to 500° C. As the frit is plastic-worked, the organic substance is discharged in the air and the gel-state paste is hardened in a solid-state frit.

After the frit as the sealant 140 is applied to the second non-display regions 30" and 120" of the upper substrate 10 and the lower substrate 100, the sealant 140 is radiated by a laser. Accordingly, the sealant 140 is melted and the molten sealant 140 is hardened, such that the upper substrate 10 and the lower substrate 100 are bonded together.

To melt and harden the sealant 140, it is radiated by a laser. However, when the FPC bonding pad unit 40 in the second non-display region 30" of the upper substrate 10 at the region overlapping the sealant 140 is made of opaque metal, e.g., the same as the sensing lines 16, the laser cannot be transmitted, such that the sealant 140 at the overlapping region is not melted and hardened.

That is, the sealant 140 cannot be completely hardened in the region, which may cause a problem in separating the sealant 140 from the region.

FIG. 3 is a cross-sectional view of the second non-display region 30" with the FPC bonding pad unit 40 of FIG. 1. Referring to FIG. 3, in the first embodiment of the present invention, it is possible to overcome the problem in separating the sealant from the region by implementing the bonding pads 42, corresponding to the region overlapping the sealant 140, using transparent conductive material 410 for the bonding pad unit 40.

Hereinafter, the configuration of the FPC bonding pad unit 40 according to an embodiment of the present invention is described in more detail.

Figure 4A:
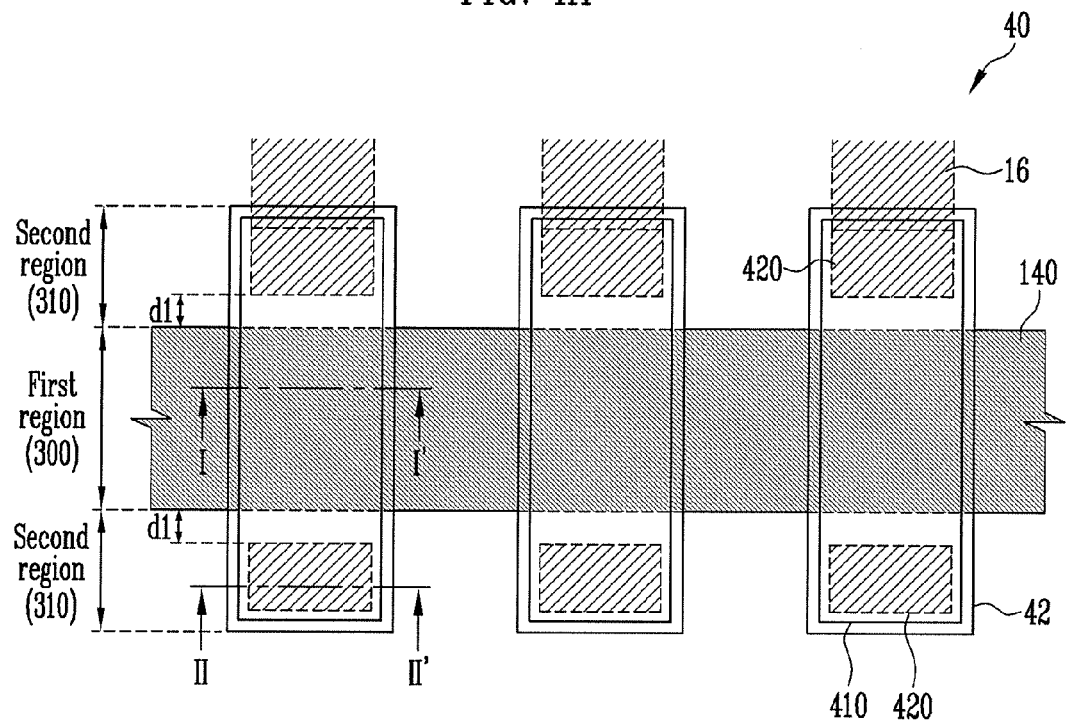
FIG. 4A is an enlarged plan view of an FC bonding pad unit according to an embodiment of the present invention.
Figure 4B:
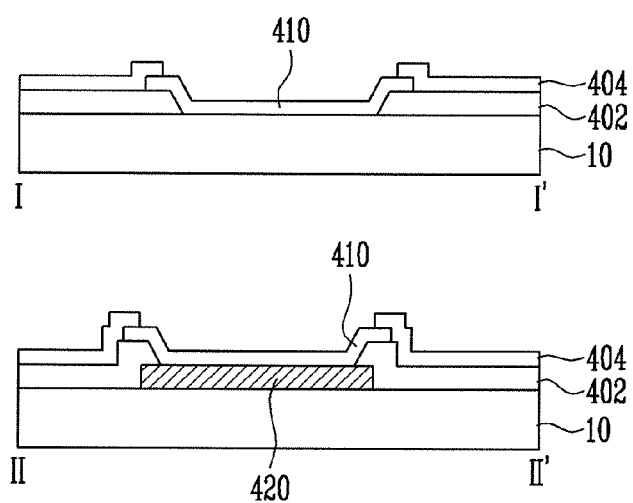
FIG. 4B is a cross-sectional view of specific portions (I-I', II-II') of FIG. 4A.

FIG. 4A is an enlarged plan view of an FPC bonding pad unit 40 according to an embodiment of the present invention, and FIG. 4B is a cross-sectional view of portions (I-I', II-II') of FIG. 4A.

Referring to FIGS. 4A and 4B, the FPC boding pad unit 40 according to an embodiment of the present invention includes a plurality of bonding pads 42, and the bonding pads 42 are divided into a first region 300 overlapping the sealant 140 and a second region 310 not overlapping the sealant 140, at the lower portion, and the configurations are different for each region.

The bonding pads 42, as described above with reference to FIG. 1, are in the second non-display region 30" of the upper substrate 10, and the sealant 140 is in a region at the lower portion of the second non-display region 30".

That is, the bonding pads 42 are divided into the first region 300 overlapping the sealant 140 and the second region 310 not overlapping the sealant 140, and according to the embodiment shown in FIG. 4A, opaque metal patterns 420, such as the sensing lines 16 shown in FIG. 1 are not in the first region 300 overlapping the sealant 140, but the transparent conductive patterns 410, such as the X- and Y-sensing patterns 12 and 14, are implemented, such that it is possible to remove the problem in separating the sealant 140 from the region by transmitting a laser for melting and hardening the sealant 140.

However, low-resistant opaque metal patterns 420 are under the first transparent conductive pattern 410 in the second region 310, which reduces resistance of the bonding pads 42 made of high-resistant transparent conductive materials.

The opaque metal patterns 420 are coupled with the sensing lines 16 described above with reference to FIG. 1, such that a change in electrostatic capacitance sensed by the sensing patterns 12 and 14 is transmitted to the driving circuit mounted on the FPC Further, the opaque metal patterns 420 in the second region 310 are spaced at a distance d1 from the sealant 140 in order not to overlap the sealant 140, in which the distance is 100 μm according to one embodiment. This is for ensuring an alignment margin in the manufacturing process.

FIG. 4B is a cross-sectional view of the bonding pad showing the first region I-I' and a cross-sectional view of the bonding pad showing the second region II-II'.

Referring to FIG. 4B, as described above, it can be seen that the bonding pad is implemented by the first transparent conductive pattern 410, except for the opaque metal pattern 420, in the first region 300 overlapping the sealant 140, and the low-resistant opaque metal pattern 420 is under the first transparent conductive pattern 410 in the second region 310.

That is, referring to the cross-sectional view of the second region II-II', the opaque metal pattern 420 is on the upper substrate 10 and a first insulating layer 402 is on the opaque metal pattern 420.

The opaque metal pattern 420 may be made of the same material as the sensing lines 16 described with reference to FIG. 1, on the same layer by the same process.

However, the first insulating layer 402 is open at the region substantially overlapping the opaque metal pattern 420 such that the opaque metal pattern 420 is exposed.

Further, the first transparent conductive pattern 410 is in the region overlapping the exposed opaque metal pattern 420 and a second insulating layer 404 is on the first transparent conductive pattern 410.

In this configuration, the first transparent conductive pattern 410 may be made of the same material as the X- and Y-sensing patterns 12 and 14 described with reference to FIG. 1, on the same layer by the same process.

However, in this case, the second insulating layer 404 is also open at the region substantially overlapping the first transparent conductive pattern 410 such that the first transparent conductive pattern is exposed, and the exposed first transparent conductive pattern 410 is in electric contact with the FPC where an external driving circuit is mounted.

On the contrary, referring to the cross-sectional view of the first region I-I', as compared with the cross-sectional view of the second region II-II', the opaque metal pattern 420 on the upper substrate 10 is removed.

That is, the first insulating layer 402 with a region open is on the upper substrate 10, and the first transparent conductive pattern 410 is formed to include the open region and the second insulating layer 404 is on the first transparent conductive pattern 410.

In this configuration, the first transparent conductive pattern 410 may be made of the same material as the X- and Y-sensing patterns 12 and 14 described with reference to FIG. 1, on the same layer by the same process.

However, the second insulating layer 404 is also open at the region substantially overlapping the first transparent conductive pattern 410 such that the first transparent conductive pattern 410 is exposed, and the exposed first transparent conductive pattern 410 is in electric contact with the FPC where an external driving circuit is mounted.

According to the FPC bonding pad unit 40 of an embodiment of the present invention as described above, when the touch screen panel is on the upper substrate 10 of the flat panel display in which the sealant 140 overlaps the bonding pads 42 of the FPC bonding pad unit 40 in a region, it is possible to remove the problem in separating the sealant 140 from the region by implementing the overlapping portions of the bonding pads 42 with the transparent conductive material 410 such that a laser can be transmitted to melt and harden the sealant 140.

By using this structure, it is possible to overcome the problem in separating the sealant from the FPC bonding pad unit 40, but the intensity of the laser beam radiated onto the sealant 140 is reduced by the first transparent conductive patterns 410 in the region, in comparison to the other regions, other than the FPC bonding pad unit 40, such that the effective seal width that is actually hardened is reduced.

In order to overcome this problem, although it is possible to ensure a uniform effective seal width by increasing the power of the laser radiated onto the sealant 140 for the FPC bonding pad unit 40 in comparison to the other regions, it is required in this case to manage the power of the laser in two levels or more in the process and the mechanical strength may be considerably reduced due to a rapid change in laser power at the left and right ends of the FPC bonding pad unit 40.

Therefore, the second embodiment of the present invention is characterized by implementing uniform power of laser beam radiated to harden the sealant, throughout the entire regions, by forming second transparent conductive patterns on the region of the upper substrate 10, which overlaps the sealant 140, at the same distances as the first transparent conductive patterns 410 on the FPC bonding pad 40.

Therefore, it is possible to overcome the problem that is caused when the first transparent conductive pattern 410 is formed only on the FPC bonding pad unit 40, that is, the change in effective seal width due to reduction in intensity of the laser beam in comparison to the other regions, such that it is possible to further simplify the manufacturing process by keeping the laser power the same when radiating the sealant 140 with the laser.

Figure 5:
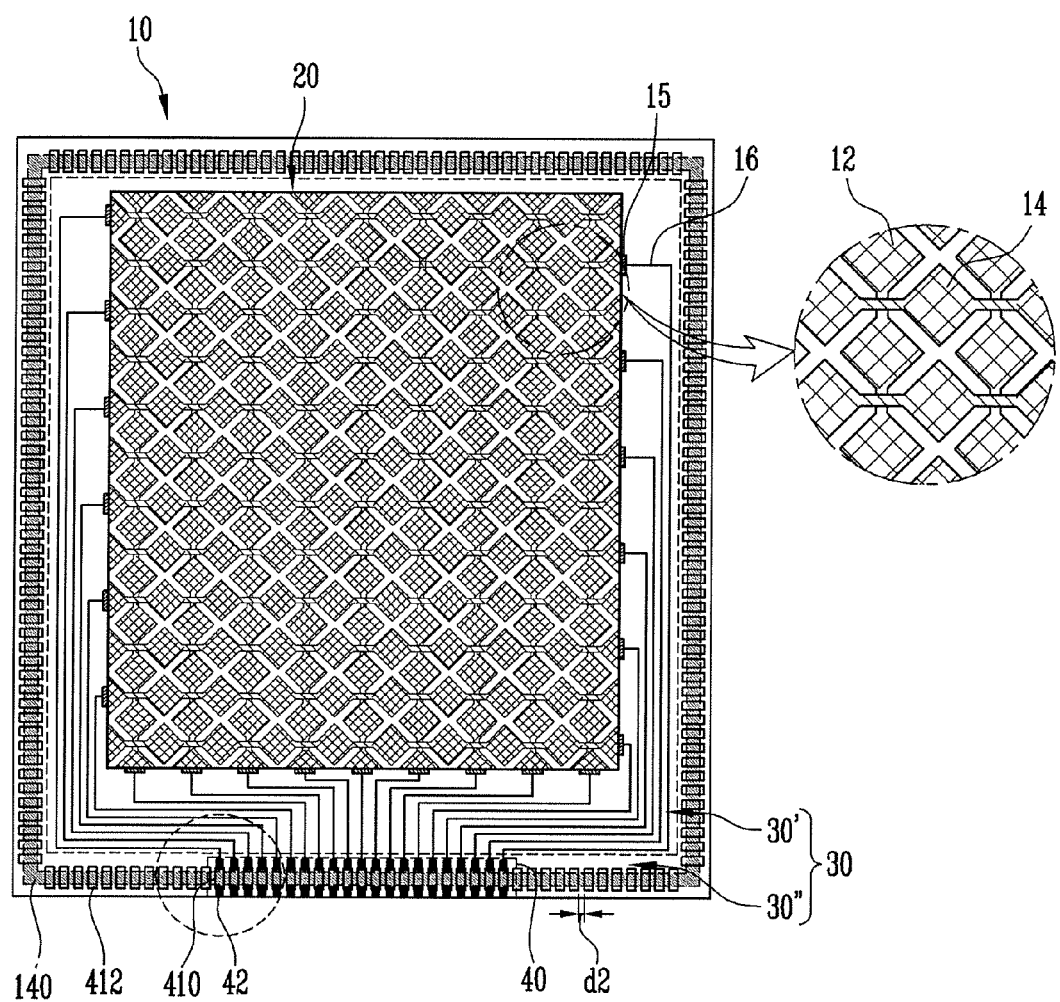
FIG. 5 is a plan view showing an upper substrate of a flat panel display according to a second embodiment of the present invention.

FIG. 5 is a plan view showing an upper substrate of a flat panel display according to a second embodiment of the present invention.

The flat panel display according to the second embodiment of the present invention is substantially the same as the first embodiment described above with reference to FIGS. 1 to 4, except that second transparent conductive patterns 412 are additionally formed in the region overlapping the sealant 140 in the second non-display region 30" of the upper substrate 10, such that the same components are designated by the same reference numerals and the detailed description is not provided.

Referring to FIG. 5, according to the second embodiment of the present invention, the second transparent conductive patterns 412 are formed on the second non-display region 30" of the upper substrate 10 which overlaps the sealant 140, at the same distances of the first transparent conductive patterns 410 on the FPC bonding pad unit 40.

In one embodiment, a distance d2 between the second transparent conductive patterns 412 is about 300 μm or less, which is the same as the distance between the first transparent conductive patterns 410.

Further, the second transparent conductive patterns 412 may be made of the same material as the X- and Y-sensing patterns 12 and 14 described with reference to FIG. 1, on the same layer by the same process.

That is, when a laser is radiated onto the upper substrate 10 with the first and second transparent conductive patterns 410 and 420, the distance d2 functions as a slit, such that the power of the laser beam applied to the sealant 140 can be implemented at the same level throughout the whole region.

Therefore, it is possible to improve the first embodiment, that is, the intensity of the laser beam radiated onto the sealant 140 is reduced in comparison to the other regions of the FPC bonding pad unit 40 and the effective seal width is practically changed.

Figure 6A:
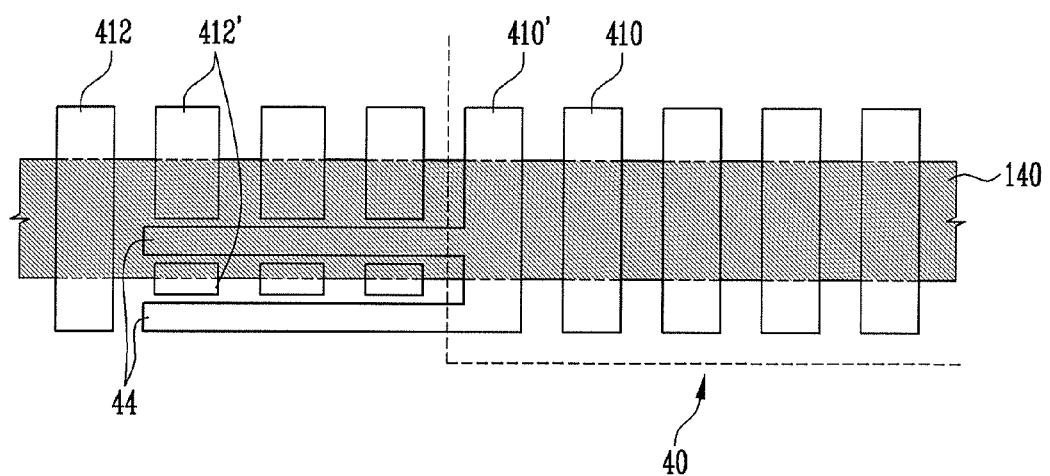
FIGS. 6A and 6B are enlarged views showing embodiments of one end region of the FPC bonding pad unit shown in FIG. 5.
Figure 6B:
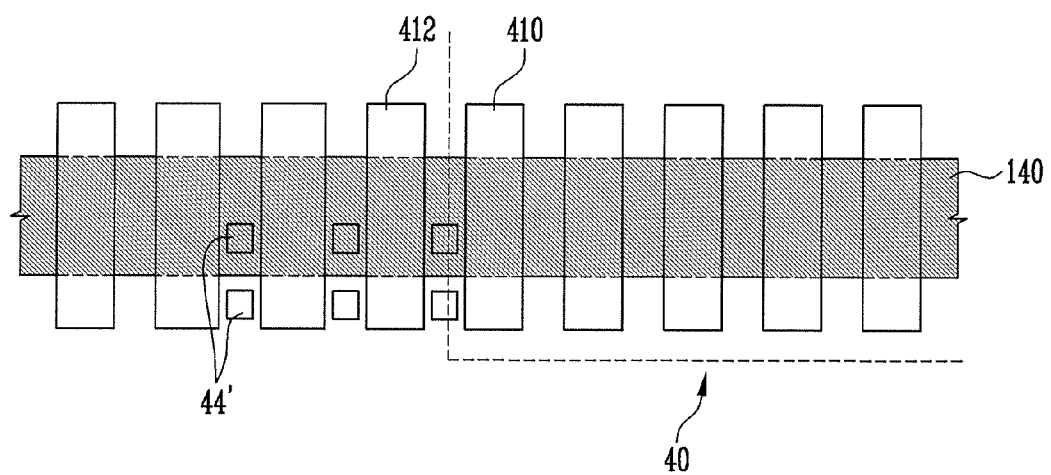

FIGS. 6A and 6B are enlarged plan views showing embodiments of one end region of the FPC bonding pad unit 40 shown in FIG. 5.

As shown in FIGS. 6A and 6B, the first transparent conductive patterns 410' at the outermost portion in the first transparent conductive patterns 410 of the bonding pad of the FPC bonding pad unit 40 are provided with alignment keys 44 to make the bonding position with the FPC clear, and the align keys 44 are formed in parallel with the sealant 140, as shown in the figure.

According to the embodiment shown in FIG. 6A, the sealant 140 is made exposed to the laser beam with the same exposure throughout as possible when the laser is radiated, by forming the second transparent conductive patterns 412' that are separated such that the alignment keys 44 are not in contact in the regions where the alignment keys 44 are formed.

According to the embodiment of FIG. 6B, the first and second transparent conductive patterns 410 and 412 are aligned with the FPC by forming the alignment keys 44' in island shapes between the first and second transparent conductive patterns 410 and 412 while the power of the laser beam applied to the sealant 140 is implemented at substantially the same level throughout the regions.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display integrated with a touch screen panel, comprising:
    an upper substrate and a lower substrate each comprising a display region and first and second non-display regions around the display region;
    a plurality of sensing patterns in the display region of the upper substrate;
    a plurality of sensing lines in the first non-display region of the upper substrate;
    an FPC bonding pad unit comprising a plurality of bonding pads coupled with the sensing lines, in the second non-display region of the upper substrate;
    a sealant between the second non-display regions of the upper substrate and the lower substrate; and
    transparent conductive patterns arranged at a same distance from the sealant in the second non-display region of the upper substrate, the transparent conductive patterns overlapping the sealant,
    wherein the transparent conductive patterns comprise first transparent conductive patterns on the FPC bonding pad unit and second transparent conductive patterns on the second non-display region, other than the FPC bonding pad unit, wherein the bonding pads of the FPC bonding pad unit comprise a first region overlapping the sealant and a second region not overlapping the sealant, and configurations of the first and second regions are different for each of the regions, wherein the second region of the bonding pads comprises:
    an opaque metal pattern in the second non-display region of the upper substrate;
    a first insulating layer with a first open region overlapping the opaque metal pattern such that the opaque metal pattern is exposed;
    a first transparent conductive pattern in a region overlapping the exposed opaque metal pattern; and
    a second insulating layer with a second open region overlapping the first transparent conductive pattern such that the first transparent conductive pattern is exposed.

2. The flat panel display integrated with a touch screen panel according to claim 1, wherein the distance between the transparent conductive patterns is 300 µm.

3. The flat panel display integrated with a touch screen panel according to claim 1, wherein the first region of the bonding pad comprises:
    a first insulating layer with a first open region in the second non-display region of the upper substrate;
    a first transparent conductive pattern at the first open region; and
    a second insulating layer with a second open region overlapping the first transparent conductive pattern such that the first transparent conductive pattern is exposed.

4. The flat panel display integrated with a touch screen panel according to claim 1, wherein the transparent conductive patterns comprise a same material as the sensing patterns.

5. The flat panel display integrated with a touch screen panel according to claim 1, wherein the opaque metal pattern comprises the same material as the sensing lines.

6. The flat panel display integrated with a touch screen panel according to claim 1, wherein the opaque metal pattern is spaced at a distance from the sealant.

7. The flat panel display integrated with a touch screen panel according to claim 6, wherein the distance is 100 µm.

8. The flat panel display integrated with a touch screen panel according to claim 1, wherein the sensing patterns comprise X-sensing patterns and Y-sensing patterns on different layers.

9. The flat panel display integrated with a touch screen panel according to claim 8, wherein the X-sensing patterns are patterned to be coupled in a first direction and the Y-sensing patterns are patterned to be coupled in a second direction crossing the first direction.

10. The flat panel display integrated with a touch screen panel according to claim 1, wherein the sealant is melted by a laser, and the upper substrate and the lower substrate are bonded together by hardening of the sealant.

* * * * *